United States Patent Office 3,346,412
Patented Oct. 10, 1967

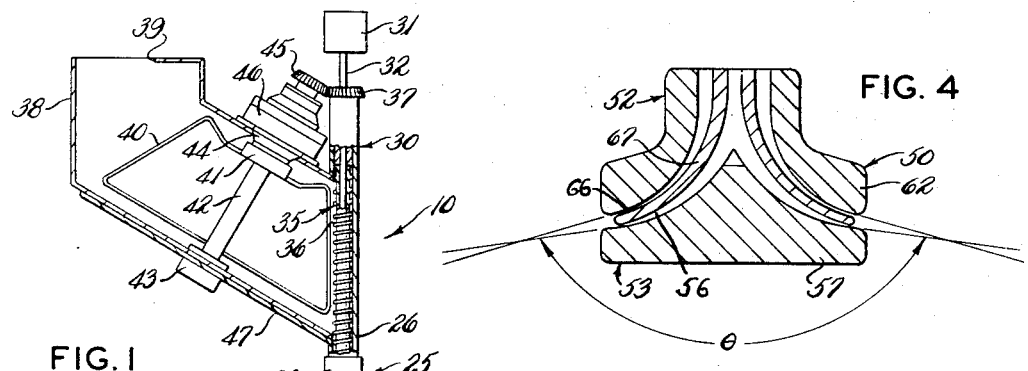
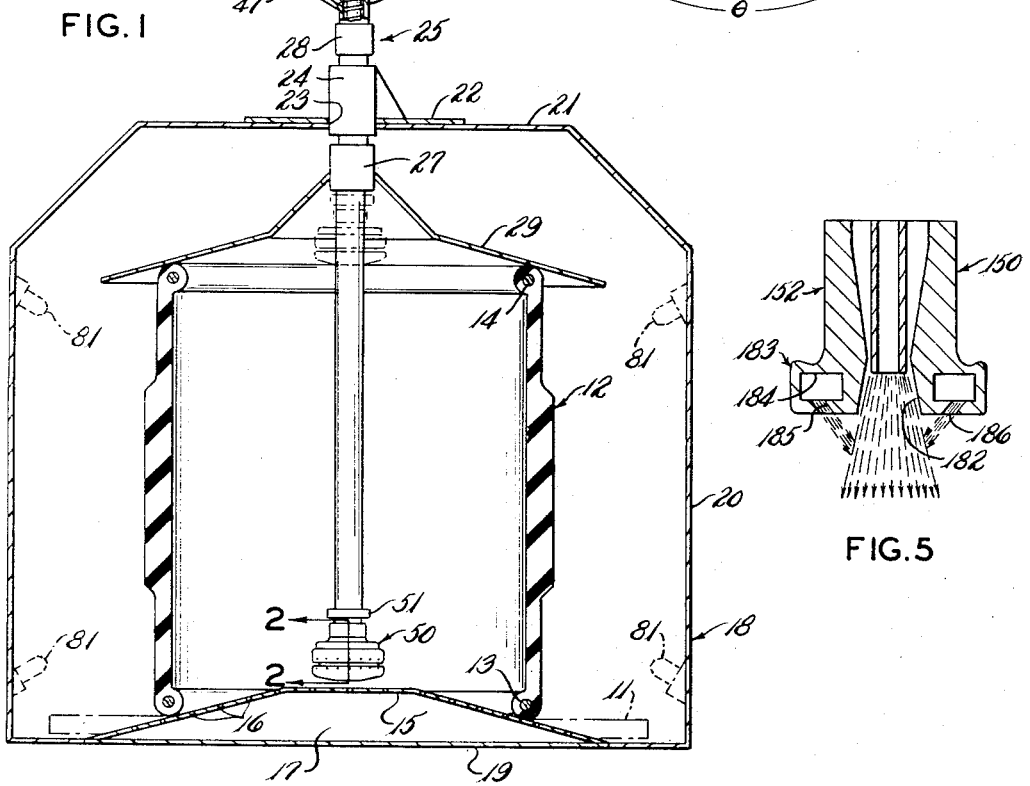
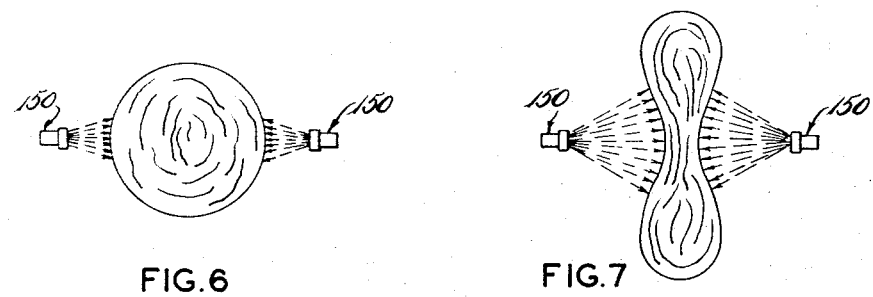

3,346,412
TIRE COATING APPARATUS
Karl Siegenthaler, Pratteln, Basel-Land, and Hans Wild, Muttenz, Basel-Land, Switzerland, assignors to Fabrik fur Firestone Produkte AG, Pratteln, Switzerland, a corporation of Switzerland
Filed Mar. 30, 1964, Ser. No. 355,640
Claims priority, application Switzerland, Sept. 4, 1963, 10,946/63
16 Claims. (Cl. 117—96)

ABSTRACT OF THE DISCLOSURE

A tire band coating apparatus having support plates enclosing the ends of said tire band and a nozzle assembly mounted on a moveable shaft with individual, air actuated feed pipe and conveyor drive mechanisms for supplying fluid and solid materials individually to the nozzle assembly which has converging discharge channels to intermix the materials and create a suspension exteriorly thereof and which also has ports outwardly of said discharge channels to enclose and direct the suspension within an air screen to the tire band. The apparatus is employed by enclosing the tire band within the support plates, moving the nozzle axially of and within the tire band, separately feeding the solid and fluid materials to the nozzle assembly, discharging the materials from the converging channels, directing the suspension of materials to the tire band surface by an air screen from the ports, and removing the coated tire.

---

Figure 2:
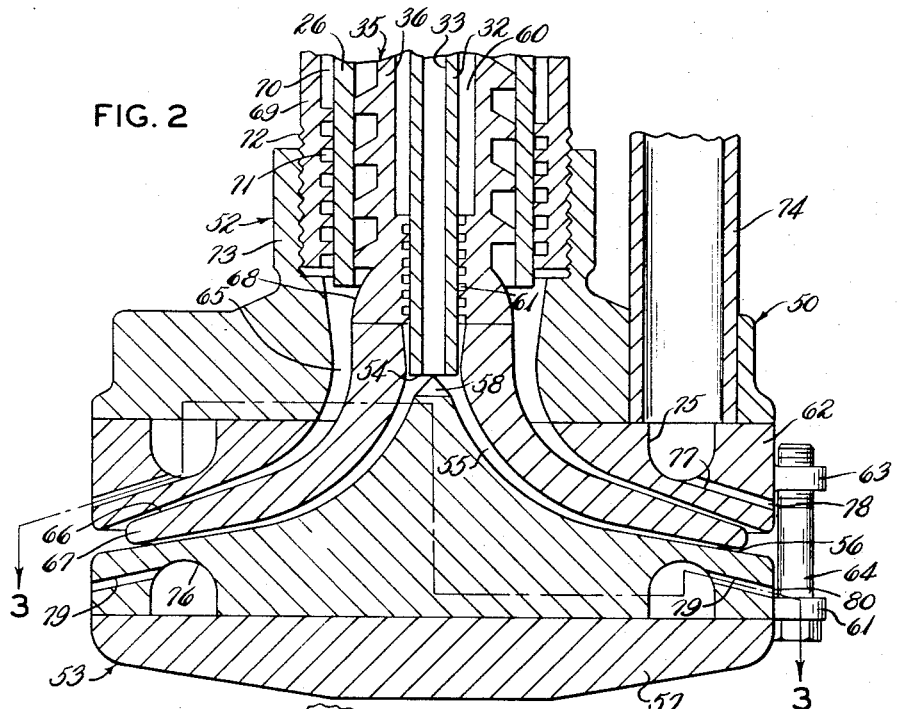

The present invention relates generally to improvements in equipment employed to deliver a controlled discharge of a suspension or combination of fluids. More particularly, the invention relates to a dispensing system used to coat an unvulvanized tire with a parting or lubricating agent. Specifically, the invention relates to an improved directional dispensing apparatus which assures a reliably controllable means of uniformly depositing a powder suspended in a liquid on the interior surface of an unvulcanized tire.

Previously, numerous forms and variations of equipment have been used to coat unvulcanized tires with a lubricating agent or dope prior to the curing operation. In some cases, the application of this lubricant or dope is accomplished by purely manual means such as by a paint brush or swab. Other devices have employed a sealed chamber with omnidirectional or grouped dispensers to saturate the interior of the enclosure and thereby coat the unvulcanized tire.

These prior art devices have tended to result in the application of a thick or uneven lubricant coating which is problematic in subsequent processing operations. The coating must be quite thin or it will act as a heat insulator during the vulcanization of the tire. Moreover, a thick coating tends to increase the time required for drying by the evaporation of the solvent, with a resulting delay or interruption of the processing sequence. An uneven coating results in a non-uniform cure which produces an inferior quality tire. Also, an uneven application of the lubricant or parting agent can result in the tire adhering or sticking to the curing press. This happens most frequently in the inside of the tire which contacts the diaphragm or bag portion of the curing press.

The prior art dispensers or spraying devices have experienced numerous difficulties in attempting to discharge the commonly used lubricants which normally consist of a suspension of a powder in a liquid. Initially, it is difficult to keep a mechanical suspension homogeneous, because some settling occurs even with good agitation and because the normal liquid components are volatile and therefore tend to evaporate rapidly. Moreover, when such a suspension is directed through conventional nozzle holes or channels, these openings tend to become clogged or blocked. This problem becomes even more critical in cases where a varied or interrupted flow of the suspension is required. The tendency of the solid to settle out of solution results in a build up of powder deposits with the end result being that the entire nozzle is completely choked. Impaired performance exists during the build up as the cross section is reduced, and replacement or time consuming cleaning operations are necessitated upon complete failure to function.

Accordingly, a principal object of the present invention is to provide an improved apparatus for uniformly depositing a lubricating agent on an unvulcanized tire.

Another object is to provide a reliably controllable dispenser which will uniformly distribute a mechanical suspension on the interior surface of an unvulcanized tire.

An additional object is to provide an improved dispenser for mechanical suspensions which is not subject to clogging or choking.

A further object is to provide a dispenser having two separate channels, each adapted to pass a powdered or granulated solid or a fluid, and providing communication between the channels only at their outlet end, if at all.

An additional object is to provide a suspension or fluids dispenser wherein the flow rates of both substances can be precisely and variably regulated to eliminate waste.

Still another object is to provide a suspension or fluids dispenser wherein the dispensed substances are carried in counter-rotating air streams which intersect outside the dispenser and cause a turbulent intermixture of the substances.

A still further object is to provide a suspension or fluids dispenser wherein the dispensed substances are enclosed and directionally controlled by counter-rotating air screens.

These and other objects of the invention and advantages thereof will become apparent from the following description taken in conjunction with the accompanying drawings.

Figure 3:
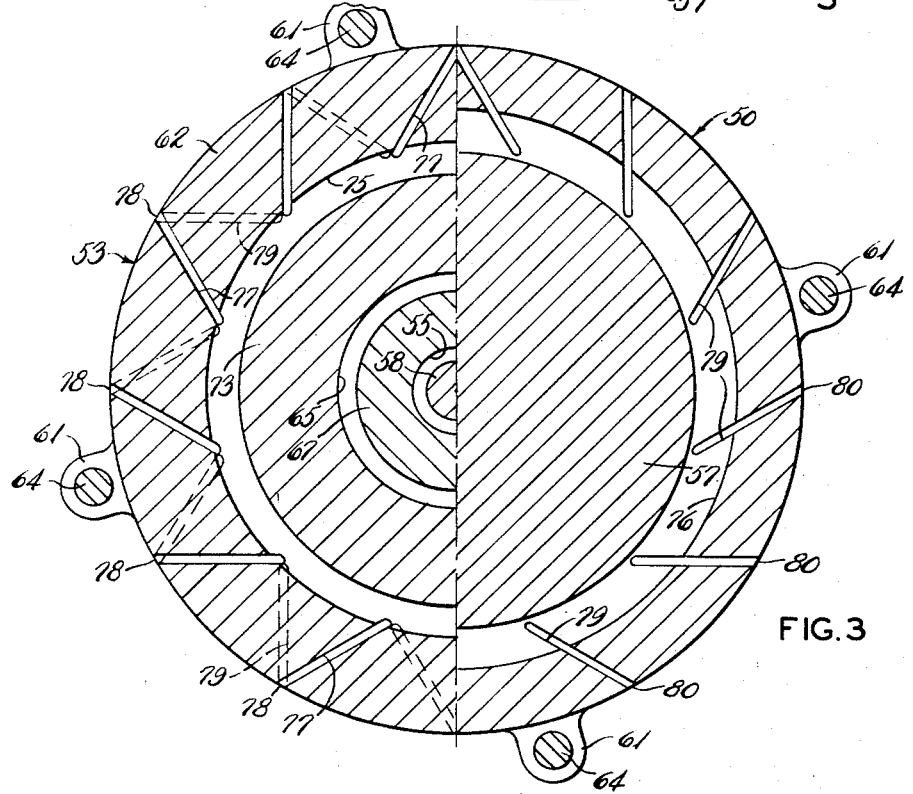

In the drawings:
FIG. 1 is a vertical section through a tire coating apparatus according to the invention showing the dispenser, the unvulcanized tire, and the enclosing structure;
FIG. 2 is an enlarged fragmentary section of the nozzle assembly of the dispenser of FIG. 1 taken substantially as indicated on line 2—2 of FIG. 1;
FIG. 3 is an enlarged section of the nozzle assembly of the dispenser of FIG. 1 taken substantially as indicated on line 3—3 of FIG. 2;
FIG. 4 is a diagrammatic sectional representation of the nozzle assembly of the dispenser of FIG. 1 showing the angular relation between the spray jets;
FIG. 5 is a diagrammatic section of a modified nozzle which has the discharge channels essentially joined and extending straight through the nozzle;
FIGS. 6 and 7 exemplify variations in the airstream paths, dependent upon the object to be sprayed, which can be accomplished by the modified nozzle of FIG. 5.

A tire coating apparatus according to the invention has a chamber for enclosing and positioning the unvulcanized tire including a lower support plate, a moveable upper support plate, and a surrounding housing. A series of perforations in the lower support plate provide communication with an exhaust chamber and a ventilation system. The dispensing assembly has a shaft mounted for selective vertical movement between the support plates. A feed mechanism at the upper end of the shaft consists of an internal coaxial feed pipe, supplied by an input head, and a positive feed screw conveyor, supplied by a hopper having internal mechanical agitation. The substances supplied by the feed mechanism through the shaft are emptied into a nozzle assembly enclosing the lower end of the shaft. The substances are mixed with low pressure air from helical ducts surrounding the feed pipe and screw conveyor in conical discharge channels having valve elements controlling the discharge of the substances. The discharge channels terminate in outlet passages on the periphery of the nozzle assembly which are enclosed by counter-rotating air screens from ports supplied by air manifolds through a series of ducts.

The tire coating apparatus, generally indicated by the numeral 10 in FIG. 1, is physically located between the tire building machines and the curing presses in the normal tire factory production line. Depending upon the extent of automation employed in the construction of a particular type of tire, a suitable conveyor mechanism, shown in phantom lines at 11, may be provided to transport the uncured tire from the tire building machine to the coating apparatus 10 and to position the tire for the lubricant coating operation. After completion of the coating operation, the conveyor 11 could remove the tire and transport it to the proper location for the next sequential step in the processing such as temporary storage, application of a preservative, or curing, as the particular instance dictates.

The unvulcanized tire 12, having lower and upper bead areas 13 and 14 respectively, is supported by the lower bead area 13 resting on the conveyor 11. During the actual spraying operation, the bead 13 rests on the lower conical support plate 15 which is frustum shaped to allow the processing of different diameter tires without adjusting or re-setting the equipment. Suitably spaced perforations or holes 16 in the lower conical support plate 15 provide communication for excess air and vapor surrounding the tire with the exhaust chamber 17 inside the lower conical support plate 15. The exhaust chamber 17 is connected to a ventilating system (not shown) which continually operates so that no dangerous vapors are freed to the surrounding atmosphere. It is therefore unnecessary for operators to wear face masks or other protective devices. A housing, generally indicated by the numeral 18, prevents the escape of these vapors. A bottom 19 of the housing 18 supports the lower conical support plate 15 and provides the lower closure for the exhaust chamber 17. A vertical wall 20 extends upwardly from the outer periphery of the bottom 19 to a position well above the tire 12, where it is joined to a top 21 to completely enclose the largest tire for which the equipment is designed.

A reinforcing plate 22 is located centrally and exteriorly of the top 21 of the housing 18. A center aperture 23 in the reinforcing plate 22 and top 21 receives a support collar 24 of the dispensing assembly, generally indicated by the numeral 25. The dispensing assembly 25 has an elongated hollow shaft 26 which extends well above and below the support collar 24. A moveable collar 27 encircles the shaft 26 below the support collar 24. A stop collar 28 is selectively attached to the shaft 26 and limits its downward movement when the top surface of support collar 24 is engaged. A generally conical upper support plate 29 is attached to the medial portion of the moveable collar 27 and contacts the upper bead 14 of the tire 12 when the moveable collar is vertically displaced by actuation means such as a pneumatic or hydraulic cylinder (not shown). When the upper support plate 29 is in contact with the upper bead 14, it provides support for the upper extremity of the tire 12 and seals the top making the interior of the tire a closed chamber.

On the upper portion of the dispensing assembly 25, located above the stationary collar 24 and attached to shaft 26, is a feed mechanism, generally indicated by the numeral 30. Mounted atop the feed mechanism 30 is an inlet head 31 which supplies a liquid substance through a feed pipe 32 which extends coaxially the length of hollow shaft 26. The coaxial through bore 33 of feed pipe 32 is preferably uniform and smooth throughout its length to facilitate a constant gravity feed of the liquid substance.

The feed mechanism 30 also has a screw conveyor, generally indicated by the numeral 35, which is adapted to provide a positive feed of powdered or granulated solid or a liquid. The screw conveyor 35 consists of the exteriorly threaded cylinder 36 which coaxially encircles the feed pipe 32 and snugly engages the inner wall of the hollow shaft 26. A bevel gear 37 seated at the top of hollow shaft 26 is attached to threaded cylinder 36 in fixed rotational relation, thereby actuating the screw conveyor 35 when the bevel gear 37 is rotated by a suitable electric motor and gear assembly (not shown).

The solid or liquid substance transmitted by the screw conveyor 35 is fed into a storage hopper 38, which is attached to the hollow shaft 26, through an opening 39 in its upper surface. A series of slots or ports or, as shown, a stripped away section 47 along the juncture between the hopper 38 and the hollow shaft 26 allows the substance to feed into the threaded cylinder 36 of screw conveyor 35. To assure a constant availability of solid substances, a wire loop or agitator 40 is mounted in the hopper 38 on a disk 41 which rotates on the shaft 42. Suitable bearing mounts 43 and 44 are attached to the hopper 38 at either end of the shaft 42 which is driven by a bevel gear 45 through a suitable gear reducer 46. The bevel gears 45 and 37 are meshingly engaged, so the wire agitator 40 is driven by the same electric motor and gear reducer (not shown) that drives the screw conveyor 35.

At the lower extremity of the dispensing assembly 25, the shaft 26 terminates in a somewhat bulb-shaped nozzle assembly, generally indicated by the numeral 50. At the upper end of the nozzle assembly 50 is an adjustment collar 51 which is secured to the shaft 26 and has functions to be later described.

Referring to FIGS. 2 and 3, the nozzle assembly 50 is divisible into an upper input section and a lower discharge section, generally indicated by the numerals 52 and 53 respectively. The lower end of the feed pipe 32 terminates in a circular valve seat 54 and empties into the lower discharge channel 55, which is a conical slot extending radially outwardly and becoming progressively narrow as it approaches an outlet passage 56 on the periphery of the lower discharge section 53. A lower housing 57 forms the bottom of the lower discharge channel 54 and has a central apex in the form of a conical valve 58. The feed pipe 32 is axially positioned by the adjustment collar 51 to allow a controlled discharge of the fluid substance between the conical valve 58 and the circular valve seat 54 into lower discharge channel 55.

Below the adjustment collar 51, an annular air duct 60 is disposed around the feed pipe 32. The lower section of the annular air duct 60 is formed as a helical channel 61 to give a rotational movement to the air as it flows into lower discharge channel 55, mixes with the liquid substance discharged from feed pipe 32, and expels the liquid from outlet passage 56 with a sufficient velocity to preclude choking or blocking. The annular air duct 60 is supplied by any convenient low pressure air source (not shown).

A plurality of bored lugs 61 are spaced about the periphery of the lower housing 57 to provide a means of attachment to an upper housing 62 which has similar tapped lugs 63 identically spaced about its periphery. The respective pairs of bored lugs 61 and tapped lugs 63 are connected and spaced by the fasteners 64, thereby controlling the width of lower discharge channel 55 and outlet passage 56. Since the fasteners tend to locally impede the expelled substance, they may be provided with streamlined fairings of a tear drop or other shape, if necessary to prevent undue accumulations.

Located radially outwardly from the feed pipe 32 and annular air duct 60 is the screw conveyor 35 having the threaded cylinder 36 and the interior wall of the hollow shaft 26 cooperating to discharge the solid substance into an upper discharge channel 65. Upper discharge channel 65 is similar to lower discharge channel 55, in that it is a somewhat conical slot extending radially outwardly and becoming progressively narrower as it approaches an outlet passage 66 on the periphery of the lower discharge section 53. Attached to screw conveyor 35 is a channel divider 67, which extends substantially conically downward and radially outwardly and defines the bottom of the upper discharge channel 65 and the top of the lower discharge channel 55. The lower boundary of the upper housing 62 forms the top of upper discharge channel 66. The hollow shaft 26 is axially positioned by the adjustment collar 51 to allow a controlled discharge of solid substance, between the lower extremity of hollow shaft 26 and a conical collar 68 at the bottom of threaded cylinder 36, into upper discharge channel 65.

Below the adjustment collar 51, a cylindrical jacket 69 having an inner annular air duct 70 is disposed around the hollow shaft 26. The lower section of the annular air duct 70 is formed as a helical channel 71 to give a rotational movement to the air as it flows into upper discharge channel 65, mixes with the solid substance discharged from screw conveyor 35, and expells the solid from outlet passage 66 with a sufficient velocity to preclude choking or blocking. Annular air duct 70 is serviced by the same low pressure air source (not shown) as annular air duct 60. The lower exterior surface of cylindrical jacket 69 has threads 72 to matingly receive an internally threaded collar 73 disposed above the upper housing 62, thereby controlling the width of upper discharge channel 65 and outlet passage 66.

The outlet passages 56 and 66 are slightly inclined towards each other so that the jets composed of the air expelled substances intersect and intermix in a region slightly displaced from the lower discharge section 53. Helical channels 61 and 71 preferably have opposite threading (one clockwise and the other counterclockwise) to impart opposed rotation to the expelled substances, resulting in increased turbulence and better mixing in the intersecting region. The turbulent external mixing of the substances, just before application to the surface to be coated, eliminates the problems normally associated with maintaining a mechanical suspension in a substantially homogeneous state.

The externally mixed composition or suspension is enclosed and directionally guided by two substantially parallel screens of moving air emitted from the periphery of the lower discharge section 53. For this purpose, a higher pressure source (not shown) than was used for the annular air ducts 60 and 70 is connected by suitable conduits, such as a hose 74, to an upper annular air manifold 75 and by suitable hose and port means (not shown) to a lower annular air manifold 76. A series of slots or ducts 77, inclined slightly from a radial direction, extend from upper annular air manifold 75 to a series of air ports 78 at the periphery of the upper housing 62. Another series of similar ducts 79, inclined slightly from a radial direction and opposite or diagonal to ducts 77, extend from lower annular air manifold 76 to a series of air ports 80 on the periphery of lower housing 57.

Referring to FIG. 1 in conjunction with FIGS. 2 and 3, the directivity of the air screens tends to maintain the tubulence of the composition or suspension while guiding it to the inner surface to the tire 12 despite variations in tire diameter. The entire dispenser assembly 25 can be vertically displaced by a pneumatic or hydraulic cylinder (not shown) to ensure a uniform distribution of the coating over the entire inner surface of the tire 12, as the nozzle assembly 50 moves from the lowermost position, as seen in FIG. 1, to the uppermost position, as depicted in chain lines in FIG. 1. It should be noted that the ducts 77 and 78 are oriented slightly downwardly from the horizontal in the embodiment of FIG. 2, so that when the nozzle assembly 50 is in its lowermost position (FIG. 1) the lower bead 13 of the tire 12 is adequately coated.

When it is desirable to coat the exterior of the tire, fixed nozzles 81, well known to the art, can be suitably positioned about the inside of the housing 18.

The embodiment shown is specifically designed to optimize handling of the powder and liquid suspensions commonly used in the tire industry. The solid may be a granulated or powdered graphite, mica, or a combination; the liquid may be petroleum, oil, alcohol, or any combination thereof.

The individual control or adjustment of the feed rate from the screw conveyor 35 and the feed pipe 32 as well as the width of outlet channels 56 and 66 makes numerous adaptations and alterations within the contemplation of the invention. For example, the powder might be fed through the feed pipe 32 and the liquid through the screw conveyor 35. Similarly, for special applications, two liquids or two solids having different properties might be dispensed. For other uses, the substances could be sprayed sequentially, thereby allowing a drying or setting time between applications. A pure air blast from the ports 78 and 80 is available at any time to facilitate drying or the removal of residual vapors through the ventilation system.

Referring to FIG. 4, the diagrammatic representation of the nozzle assembly 50 described above, a spray angle $\theta$ is the lower included angle between diametrically opposite points of the streams sprayed through the lower outlet passage 56 and is between 130° and 175°, preferably between 160° and 170°, and the analogous angle of the upper passage 66 is 10° to 22° minor, preferably 15° to 19°. Depending upon the desired directivity for a particular application, the spray angle can be varied anywhere between 0° and 180° with only minor modification in the above disclosed structure.

Although the nozzle assembly 50 is extremely versatile and may be utilized in a variety of installations, a modified form of the invention, shown in FIG. 5, is advantageous for an extremely directional or concentrated spray when the spray angle $\theta$ approaches 0°. The nozzle assembly, generally indicated by the numeral 150, has an upper input section, generally indicated by the numeral 152, identical to the input section 52 of the nozzle assembly 50. However, both substances, after mixing with low pressure air, are expelled from the conical throat 182. The lower discharge section, generally indicated by the neumeral 183, has only a single annular air manifold 184, with a series of suitable ducts 185 extending from the air manifold 184 to a series of air ports 186 at the lower surface of the nozzle assembly 150 and creates a conical air screen.

The directivity of the spray is controlled primarily by the inclination of the ducts 185 and the variations in the air screen pressure. The nozzle assembly 150 may be installed in pairs on opposite sides of th eobject to be coated as seen in FIGS. 6 and 7. In view of the shape or configuration of the objects to be coated, the directivity can be varied as exemplified by a comparison of FIGS. 6 and 7. The nozzle assembly 150 may be used in the embodiment of FIG. 1 as the fixed nozzles 81 employed to coat the exterior surface of the tire 12.

The preferred form of the invention and exemplary modifications have been shown and described in sufficient detail to enable one skilled in the art to practice the invention. Since additional modifications exist within the spirit of the invention, the scope of the invention should be limited solely by the scope of the attached claims.

What is claimed is:

1. A tire band coating apparatus comprising, a lower support plate, a shaft movably mounted above said lower support plate, an upper support plate slidably mounted on said shaft, a nozzle assembly at one end of said shaft selectively positioned between said upper support plate and said lower support plate by movement of said shaft when said plates engage said tire band, a feed pipe positioned coaxially within said shaft, conveyor means disposed about said feed pipe, said feed pipe and said conveyor means communicating with said nozzle assembly, a housing adapted to restrict the escape of the coating substance, and exhaust means to evacuate said housing.

2. A tire band coating apparatus comprising, a lower support plate, a shaft movably mounted above said lower support plate, an upper support plate slidably mounted on said shaft, a nozzle assembly at one end of said shaft selectively positioned between said upper support plate and said lower support plate by movement of said shaft when said plates engage said tire band, a feed pipe for a liquid positioned coaxially within said shaft and extending substantially the length thereof, a screw conveyor for a solid material mounted coaxially about the length of said feed pipe and encased within said shaft, said feed pipe and said screw conveyor communicating with said nozzle assembly to discharge the solid material suspended in the liquid, a housing adapted to restrict the escape of the coating substance, and exhaust means to evacuate said housing.

3. A tire band coating apparatus comprising, a lower support plate, a shaft movably mounted above said lower support plate, an upper support plate slidably mounted on said shaft, a nozzle assembly at one end of said shaft selectively positioned between said upper support plate and said lower support plate by movement of said shaft when said plates engage said tire band, a feed pipe positioned coaxially within said shaft, an inlet head mounted on said feed pipe, a screw conveyor mounted coaxially about said feed pipe, a storage hopper mounted on said shaft in communicative relation with said screw conveyor, said feed pipe and said screw conveyor communicating with said nozzle assembly, a housing adapted to restrict the escape of the coating substance, and exhaust means to evacuate said housing.

4. In a tire coating apparatus, a dispensing assembly comprising, a shaft, a feed mechanism communicatively attached to said shaft, a nozzle assembly encasing one end of said shaft, a feed pipe positioned coaxially within said shaft, a screw conveyor mounted coaxially about said feed pipe, and conical channels connecting said feed pipe and said screw conveyor to the periphery of said nozzle assembly.

5. In a tire coating apparatus, a dispensing assembly comprising, a shaft, a feed mechanism communicatively attached to said shaft, a nozzle assembly encasing one end of said shaft, a feed pipe positioned coaxially within said shaft, a screw conveyor mounted coaxially about said feed pipe, substantially conical channels connecting said feed pipe and said screw conveyor to the periphery of said nozzle assembly and air ducts radially surrounding said feed pipe and said screw conveyor and communicating with said conical channels.

6. In a tire coating apparatus, a dispensing assembly comprising, a shaft, a feed mechanism communicatively attached to said shaft, a nozzle assembly encasing one end of said shaft, a feed pipe positioned coaxially within said shaft, a screw conveyor mounted coaxially about said feed pipe, conical channels connecting said feed pipe and said screw conveyor to the periphery of said nozzle assembly, and air ducts radially surrounding said feed pipe and said screw conveyor and communicating with said conical channels, said air ducts having lower sections formed as helical channels.

7. In a tire coating apparatus, a dispensing assembly comprising, a shaft, a feed mechanism communicatively attached to said shaft, a nozzle assembly encasing one end of said shaft, a feed pipe positioned coaxially within said shaft, a screw conveyor mounted coaxially about said feed pipe, conical channels connecting said feed pipe and said screw conveyor to the periphery of said nozzle assembly, air ducts radially surrounding said feed pipe and said screw conveyor and communicating with said conical channels, said air ducts having lower sections formed as helical channels, and a plurality of air ports disposed on either side of said conical channels around the periphery of said nozzle assembly.

8. In a tire coating apparatus, a dispensing assembly comprising, a shaft, a feed mechanism communicatively attached to said shaft, a nozzle assembly encasing one end of said shaft, a feed pipe positioned coaxially within said shaft, a screw conveyor mounted coaxially about said feed pipe, substantially conical channels connecting said feed pipe and said screw conveyor to the periphery of said nozzle assembly, a plurality of annular air manifolds, a plurality of air ports disposed on either side of said conical channels about the periphery of said nozzle assembly, and ducts connecting said annular air manifolds and said air ports.

9. In a tire coating apparatus, a dispensing assembly comprising, a shaft, a feed mechanism communicatively attached to said shaft, a nozzle assembly encasing one end of said shaft, a feed pipe positioned coaxially within said shaft, a screw conveyor mounted coaxially about said feed pipe, conical channels connecting said feed pipe and said screw conveyor to the periphery of said nozzle assembly, a plurality of annular air manifolds, a plurality of air ports disposed on either side of said conical channels about the periphery of said nozzle assembly, and ducts connecting said annular air manifolds and said air ports, said ducts connected to air ports on one side of said conical channels being inclined in one direction from the radial and said ducts on the other side of said conical channels being oppositely inclined.

10. In a tire coating apparatus, a dispensing assembly comprising, a shaft, a feed mechanism communicatively attached to said shaft, a nozzle assembly encasing one end of said shaft, a feed pipe positioned coaxially within said shaft, a screw conveyor mounted coaxially about said feed pipe, conical channels connecting said feed pipe and said screw conveyor to the periphery of said nozzle assembly, and valve means selectively controlling the openings between said feed pipe and said conical channels and between said screw conveyor and said conical channels.

11. A suspension or mixed fluids dispenser comprising, a lower discharge channel, an upper discharge channel, feed means individually supplying the components to be dispensed to said discharge channels, outlet passages convergingly disposed at the termination of said channels on the periphery of said dispenser to intermix the components outwardly of said dispenser, and substantially parallel port means outwardly of said discharge channels providing an air screen externally enclosing and directing the suspension or fluids.

12. A suspension or mixed fluids dispenser comprising, a lower discharge channel, an upper discharge channel, a feed pipe supplying said lower discharge channel, a screw conveyor supplying said upper discharge channel, an air duct radially surrounding said feed pipe and communicating with said lower discharge channel, a second air duct radially surrounding said screw conveyor and communicating with said upper discharge channel, and port means outwardly of said discharge channels providing an air screen externally enclosing and directing the materials emitted from said discharge channels.

13. A suspension or fluids dispenser comprising a lower discharge channel, an upper discharge channel, feed means individually supplying the components of the suspension or fluids to said discharge channels, outlet passages at the termination of said channels on the periphery of said dispenser, a plurality of annular air manifolds, a plurality of air ports disposed outwardly of said upper and lower discharge channels about the periphery of said dispenser, said air ports on one side of said discharge channels being inclined in one direction from the radial and said air ports on the other side being oppositely inclined, and ducts connecting said annular air manifolds and said air ports.

14. A suspension or fluids dispenser comprising, a lower discharge channel, an upper discharge channel, feed means individually supplying the components of the suspension or fluids to said discharge channels, outlet passages at the termination of said channels on the periphery of said dispenser, a plurality of annular air manifolds, a plurality of air ports disposed on either side of said upper and lower discharge channels about the periphery of said dispenser, and ducts connecting said annular air manifolds and said air ports, said ducts connected to air ports on one side of said upper and lower discharge channels being inclined in one direction from the radial and said ducts on the other side of said upper and lower discharge channels being oppositely inclined.

15. A method of substantially uniformly coating the interior surface of an unvulcanized tire band with a lubricating agent by the controlled distribution of a powdered solid suspended in a liquid comprising the steps of, enclosing the tire band between support plates engaging the bead areas, moving an omnidirectional nozzle assembly axially of and within said tire band, separately feeding the powdered solid and liquid materials to the nozzle assembly, discharging the powdered solid and liquid individually by air pressure from converging discharge channels to effect mixing externally of the nozzle assembly, enclosing the mixed materials within substantially parallel air streams directed toward the tire surface, and removing the coated tire band from between the support plates for the curing operation.

16. The method according to claim 15 including the step of exhausting the enclosed area defined by the tire band and the support plates to remove vapors therefrom.

References Cited

UNITED STATES PATENTS

| 1,850,481 | 3/1932 | Telfer | 118—317 |
| 2,069,845 | 2/1937 | Paasche | 118—317 |
| 2,336,946 | 12/1943 | Marden et al. | 117—96 |
| 2,520,397 | 8/1950 | Green | 117—96 X |
| 2,586,348 | 2/1952 | Kuebler | 117—96 X |
| 2,619,430 | 11/1952 | Fink | 117—96 X |
| 2,827,009 | 3/1958 | Norris | 118—317 X |
| 2,897,743 | 8/1959 | Marantz | 118—326 X |
| 3,020,819 | 2/1962 | Kunen | 239—416 X |
| 3,219,276 | 11/1965 | Norris | 239—420 X |

FOREIGN PATENTS

| 1,011,037 | 2/1952 | France. |
| 21,468 | 1912 | Great Britain. |

ALFRED L. LEAVITT, *Primary Examiner.*

J. H. NEWSOME, *Assistant Examiner.*